Figure 1:
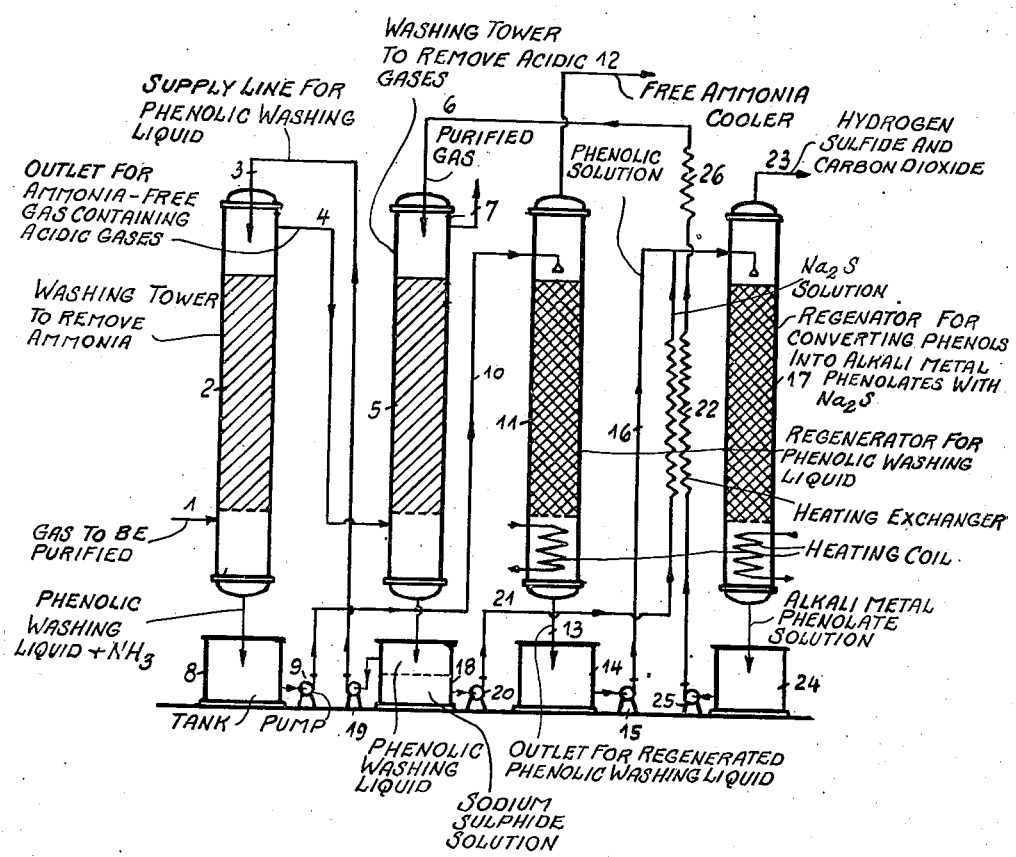

June 30, 1942.                H. BAEHR                2,288,176
                 RECOVERY OF READILY VOLATILE BASES
                     Filed Jan. 20, 1939         2 Sheets-Sheet 1

Hans Baehr
INVENTOR.

BY

HIS ATTORNEYS

June 30, 1942.    H. BAEHR    2,288,176
RECOVERY OF READILY VOLATILE BASES
Filed Jan. 20, 1939    2 Sheets-Sheet 2

Hans Baehr
INVENTOR.
BY
HIS ATTORNEYS

Patented June 30, 1942

2,288,176

UNITED STATES PATENT OFFICE 2,288,176

RECOVERY OF READILY VOLATILE BASES

Hans Baehr, Leuna, Germany

Application January 20, 1939, Serial No. 251,998
In Germany January 21, 1938

7 Claims. (Cl. 23—196)

The present invention relates to the recovery of readily volatile bases. The process according to the present invention is of particular value in connection with the recovery of ammonia, but it is equally applicable to the recovery of other readily volatile bases, as for example of the methylamines or of ethylamine. The invention in a specific aspect is concerned with the separation of the said readily volatile bases from fluids, i. e. solutions or gas or vapor mixtures which contain the said bases along with one or more gaseous weak acids, as for example hydrogen sulphide, carbon dioxide, sulphur dioxide or hydrocyanic acid.

Hitherto the recovery of ammonia and other readily volatile bases from fluids has been attended with considerable difficulties. For example concentrated aqueous ammonia can be prepared from dilute aqueous ammonia only with the consumption of much heat. If ammonia is to be recovered from gases, it may be removed therefrom by scrubbing with water or with acids. When working with acids, the ammonia is obtained as a salt and is therefore not directly available in the form of free ammonia such as is used for example for the production of nitric acid by oxidation. When working with water only dilute aqueous solutions are obtained. When the gases contain in addition to the ammonia weak gaseous acids and when scrubbing with water, aqueous solutions of ammonium salts, as for example ammonium carbonate, are obtained which cannot be worked up in a simple manner to free concentrated ammonia.

I have now found that ammonia and other readily volatile bases can be recovered from fluids, i. e. solutions or gas or vapor mixtures, containing the same, which fluids may also contain gaseous weak acids, by treating the solutions or gases with weak organic acids which form ammonium salts capable of being decomposed by heating. These organic acids should in order of magnitude have at the most the same dissociation constant as the ammonia and referably be much weaker. Among suitable organic acids there may be mentioned in particular carboxylic acids containing amino or imino groups, such as glycocoll, alanine, methylalanine, dimethylalanine, hydroxyethylalanine, iminodicarboxylic acids, such as iminodipropionic acid, carboxylic acids derived from amines having several nitrogen atoms, such as ethylenediaminomonoacetic acid, albumin degradation products or mixtures of a plurality of such acids, and also amino- or imino-sulphonic acids, such as taurine or its substitution products, and also monohydric or polyhydric, mononuclear or polynuclear phenols or their derivatives, such as phenol, cresols, xylenols, naphthols, chlorphenols or mixtures of the same. On the other hand, stronger acids, as for example acetic acid or citric acid, are not suitable because when using the same the ammonia can only be recovered incompletely in the free form. The organic acids are caused to act in liquid form on the solutions or gases. Thus when the acids are themselves liquid, they may be used as such or in solution. In other cases they must be dissolved in suitable solvents, among which for example there may be mentioned water, hydrocarbon oils, such as washing oils, and alcohols.

In the treatment of the solutions or gases with the organic acids, the latter absorb the ammonia while the gaseous weak acids, such as hydrogen sulphide or carbon dioxide, are not bound.

The solutions or gases to be treated are brought into contact with the organic acids in any way, preferably in washing towers, the temperature as a rule being between about 20° and 50° C. Generally speaking the absorption of the ammonia proceeds better the lower the temperature in the washing apparatus. The temperature must be adjusted, however, so that only the ammonia is absorbed by the liquid, the weak gaseous acids not being bound. The temperature to be used depends not only on the nature of the weak gaseous acids, but also in particular on the nature of the organic acids. For example when working with phenols in a column, it is preferable to maintain a temperature of from about 50° to 60° in the upper part and a temperature of from about 90° to 95° C. in the lower part.

The treatment of the solutions or gases with the organic acids may take place under atmospheric, reduced or increased pressure.

The organic acids laden with ammonia may be freed therefrom in a simple manner by heating and then, after cooling, may be used again for absorption. Such regeneration is preferably carried out in a column. Upon heating, the ammonia usually escapes together with water vapor from which it may be freed by cooling. It may then be further treated in a suitable manner. For example ammonia may be oxidized to nitric acid or introduced into water and thereby converted into concentrated aqueous ammonia or introduced into acids, whereby concentrated ammonium salt solutions are obtained.

If the initial materials contain more than one weak gaseous acid in addition to ammonia, as for example carbon dioxide and hydrogen sulphide, these may also be recovered separately. For example hydrogen sulphide may be expelled from a solution also containing ammonia and carbon dioxide, by leading in carbon dioxide, the resulting solution containing only ammonia and carbon dioxide as ammonium carbonate or ammonium bicarbonate then being treated as above described.

If ammoniacal solutions be treated in the said way, it is advantageous to use organic acids which are as little soluble in water as possible, in particular phenols. When working with water-soluble organic acids, there must usually be carried out, after the expelling of the ammonia, an evaporation so that the water added by the ammoniacal solution should not become enriched in the cycle of the organic acid. In this way, for example an aqueous solution of ammonia, such as is obtained by washing gases having a low content of ammonia, with water, may be freed in a simple manner from ammonia. Similarly, gas liquor may be worked up.

The process can be carried through in a particularly simple manner when treating gases which contain readily volatile bases, as for example ammonia. The treatment of gaseous fluids may even be made use of when the readily volatile bases are originally present in solution. For example when working up an aqueous solution containing ammonia and carbon dioxide or hydrogen sulphide, the ammonia and the carbon dioxide or hydrogen sulphide are first driven out of the solution and the resulting vapor mixture is acted upon with the auxiliary liquid, either directly or after the bulk of the water has been separated therefrom by cooling, preferably down to about the sublimation point of ammonium salts. In order to drive out the ammonia and the gaseous weak acids, the aqueous ammonium salt solution is preferably heated in a column by the introduction of direct or indirect steam, and the resulting vapor mixture acted upon with the auxiliary liquid either directly or after cooling it to about 90° C.

The process in accordance with the present invention offers particular advantages when using it in conjunction with the removal of gaseous weak acids, as for example hydrogen sulphide, from the gas containing ammonia by means of solutions which contain alkaline reacting salts of weak organic acids, preferably alkali metal salts of phenols. When absorbing the gaseous weak acids, for example by means of sodium phenolate solution, these acids are bound as sodium sulphide or sodium carbonate, while the phenol is set free. This phenol may now be withdrawn and serve for the removal of ammonia from the gas. The phenol laden with ammonia may now be regenerated together with the solution formed by the absorption of the gaseous weak acids, whereby the ammonia and the gaseous acids are recovered simultaneously and at the same time a sodium phenolate solution is formed, which is again suitable for the gas purification. One may also proceed by regenerating the phenol laden with ammonia separately and adding the regenerated phenol to the solution which is to be freed from the gaseous weak acids. In this way the ammonia is recovered separately from the gaseous weak acids, while at the same time again a sodium phenolate solution is formed, which is suitable for purifying further amounts of gas.

The process according to the present invention may also be directly connected to a plant in which a mixture of ammonia and hydrogen sulphide or carbon dioxide is produced. For example in the purification of coke oven gas by means of a sodium phenolate solution the latter takes up ammonia and hydrogen sulphide, and these may simultaneously be driven out from the said solution. The resulting gas mixture is freed from the bulk of the water by cooling to about 70° C. and may now be introduced into a column into which phenol is introduced and in which the separation of the ammonia from the hydrogen sulphide takes place.

The following examples will further illustrate how the present invention may be carried out in practice, reference being had to the accompanying drawings, but it is to be understood that the invention is not limited to these examples.

*Example 1*

100 cubic meters of a gas containing 9.3 per cent of ammonia are treated per hour with 100 liters of a mixture of equal parts of phenol and water in a washing tower. The ammonia is taken up by the liquid to such an extent that the treated gas contains less than 10 milligrams of ammonia per cubic meter. The liquid laden with ammonia is now heated in a column, whereby concentrated ammonia is driven out. In order to free it from traces of phenol which may be present therein, the ammonia may be passed through caustic soda solution. It is then directly suitable for being catalytically oxidized to nitric acid.

*Example 2*

The apparatus shown in Figure 1 is used in order to recover the ammonia and hydrogen sulphide from a coal distillation gas which contains 5 grams of ammonia, 8 grams of hydrogen sulphide, 1.2 grams of hydrogen cyanide and 40 grams of carbon dioxide per cubic meter.

1500 cubic meters of gas, which have been subjected to the usual cooling and tar separation, are led per hour through a pipe 1 into a washing tower 2 which is supplied by the pipe 3 with 100 liters of a phenol mixture boiling between 190 and 220° C. and consisting mainly of cresols. The gas freed from ammonia leaves the washing tower 2 by a pipe 4 and is introduced into a washing tower 5, in which it is scrubbed with 1 cubic meter of a sodium cresolate solution of about 25 per cent strength, which is supplied by a pipe 6. The purified gas is withdrawn by a pipe 7.

The liquid leaving the bottom of the washing tower 2 is collected in a tank 8, supplied by way of a pump 9 and a pipe 10 into a regenerating column 11, in which it is heated, and thus freed from ammonia, which escapes in a concentrated form through a pipe 12. The liquid freed from ammonia leaves the regenerating column 11 by a pipe 13 and is conducted through a container 14, a pump 15 and a pipe 16 into a regenerating column 17.

The liquid leaving the washing tower 5 is collected in a tank 18 and therein separates into two layers. The upper layer which consists of cresols, is conducted through pump 19 and pipe 3 into the washing tower 2. The lower layer mainly consists of sodium sulphide solution, is passed by a pump 20, a pipe 21 and a heat exchanger 22 into the pipe 16 and into the regenerating column 17. In this column it is heated together with the cresolic liquid supplied by the pipe 16 and thus freed from hydrogen sulphide and carbon dioxide which escape through the pipe 23. At the same time a sodium cresolate solution is formed which is passed from the lower part of the regenerating column 17 into a tank 24 and then by way of a pump 25, the heat exchanger 22 and a cooler 26 back into the pipe 6 and washing tower 5.

*Example 3*

1 cubic meter of gas liquor containing per liter 170 grams of ammonia, 140 grams of carbon dioxide, 34 grams of hydrogen sulphide and 5 grams of hydrocyanic acid, is treated in a reaction tower with about 60 cubic meters of carbon dioxide, whereby the hydrogen sulphide is driven out practically completely and obtained as a gas containing about 50 per cent of hydrogen sulphide. The resulting solution of ammonium carbonate is heated to about 60° C. and introduced into the upper part of a column at the top of which a temperature of about 60° C. and at the bottom of which a temperature of about 90° to 100° C. is maintained. At the top of the column about 2.5 cubic meters of a crude mixture of phenol and cresols boiling between 180° and 210° C., are introduced. Carbon dioxide with only traces of ammonia escapes at the top of the column. At the bottom thereof the phenol-cresol mixture charged with ammonia is withdrawn and supplied into a stirring vessel in which it is heated for some time to 120° C., whereby the ammonia is driven out. The phenol-cresol mixture freed from ammonia is returned into the column after the water has been evaporated and the mixture cooled. In this way 167 kilograms of ammonia in a pure form are obtained from the gas. By washing the carbon dioxide and the hydrogen sulphide, as for example with sulphuric acid, additional 3 kilograms of ammonia can be obtained in a combined form. The hydrogen sulphide may be worked up directly, for example to sulphur or sulphur dioxide or sulphuric acid.

*Example 4*

Figure 2:
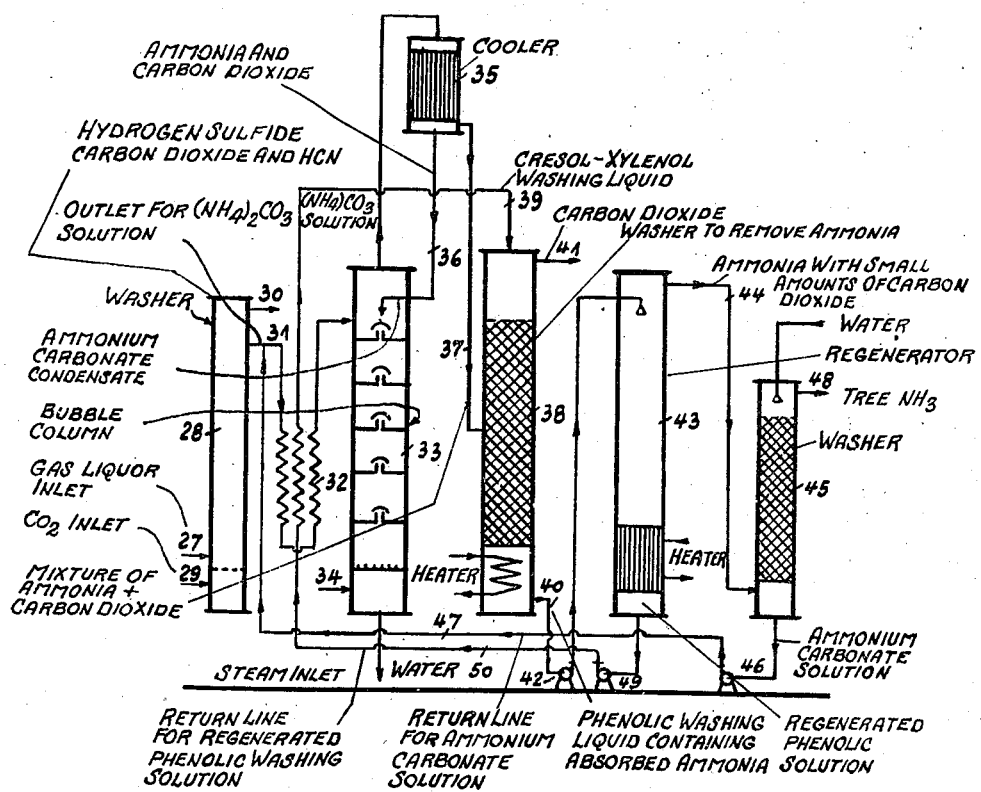

In the apparatus diagrammatically illustrated in Figure 2, 10 cubic meters of gas liquor with 17 per cent of ammonia, 14 per cent of carbon dioxide, 3.4 per cent of hydrogen sulphide and 5 grams of hydrocyanic acid per cubic meter are supplied per hour by a pipe 27 into a tower 28 having a diameter of 1 meter. At the bottom of this tower about 600 to 700 cubic meters of carbon dioxide are introduced through a pipe 29, the temperature in the tower being maintained at about 45° C. At the top of the tower 240 cubic meters of hydrogen sulphide, which is mixed with carbon dioxide, and hydrocyanic acid in the proportion of about 1:1 escape through a pipe 30. The ammonium carbonate solution is withdrawn form the tower through a pipe 31 and passed by way of a heat exchanger 22 into a column 33 in which it is heated by means of steam supplied by way of a pipe 34. In this way the ammonia and the carbon dioxide are driven out and led into a cooler 35, wherein the said gases are cooled to about 90° C. A condensate containing ammonium carbonate is formed, which is returned into the cooler 33 by means of a pipe 36. The remaining mixture of ammonia and carbon dioxide is introduced by way of a pipe 37 into a column 38, which is supplied by way of a pipe 39 with 30 cubic meters of a cresol-xylenol mixture. The said mixture is introduced while having a temperature of about 50° C. and the column is heated by means of steam in its lower part, so that the liquid leaves the column by way of a pipe 40 while having a temperature of about 90 to 100° C. From the upper part of column 38 carbon dioxide is withdrawn through a pipe 41. It contains only traces of ammonia. The liquid from the pipe 40 is supplied by means of a pump 42 into the top of a tower 43 in which it is heated to 120° C. Ammonia with only small amounts of carbon dioxide is driven out from the liquid and escapes through pipe 44. It may be supplied to a washer 45 in which it is scrubbed by means of water or weak ammonium carbonate solution and thus freed from any carbon dioxide still present therein. The ammonium carbonate solution formed in this washer may be converted for example into ammonium nitrate by reacting it with nitric acid, or it may be introduced into the pipe 31 by means of a pump 46 and a pipe 47. The ammonia which has been freed from carbon dioxide and hydrogen sulphide leaves the washer 45 at 48. It may, if desired, after further purifying it by means of bog iron ore and caustic alkali solution, be oxidized directly to oxides of nitrogen. The cresol-xylenol mixture leaving the lower portion of the column 43 is supplied by means of a pump 49, a pipe 50 and the heat exchanger 32 into the pipe 39.

While in the foregoing I have explained my invention with particular reference to the recovery of ammonia, it is to be understood that the process is equally applicable to the recovery of other readily volatile bases, as for example the mono-, di- or tri-methyl amines or ethyl amine. In the appended claims, ammonia and such alkyl substitution products of ammonia are collectively referred to as "volatile amino base."

What I claim is:

1. The process of treating a fluid containing a volatile amino base and a gaseous weak acid for selectively recovering said volatile amino base therefrom which comprises contacting said fluid at a temperature at which substantially only said volatile amino base is absorbed, with a liquid essentially comprising a substance selected from the group consisting of phenol, cresols, xylenols and mixtures thereof.

2. The process as claimed in claim 1, in which said fluid is a gas.

3. The process as claimed in claim 1, in which said volatile amino base is ammonia.

4. The process as claimed in claim 1, in which said fluid is a gas and said volatile amino base is ammonia.

5. The process as claimed in claim 1, in which said substance is phenol.

6. The process as claimed in claim 1, in which said substance is cresol.

7. The process as claimed in claim 1, in which said substance is a cresol-xylenol mixture.

HANS BAEHR.